United States Patent Office.

RICHARD LAUCH AND CARL KREKELER, OF ELBERFELD, GERMANY, ASSIGNORS TO THE FARBENFABRIKEN, VORMALS FR. BAYER & CO., OF SAME PLACE.

BLACK AZO DYE.

SPECIFICATION forming part of Letters Patent No. 502,368, dated August 1, 1893.

Application filed February 6, 1893. Serial No. 461,243. (Specimens.) Patented in England May 18, 1889, No. 8,299; in France October 21, 1889, No. 198,521; in Germany November 10, 1889, No. 58,271, and in Italy February 28, 1891, XXV, 29,265, LVII, 442.

*To all whom it may concern:*

Be it known that we, RICHARD LAUCH and CARL KREKELER, chemists, doctors of philosophy, (assignors to the FARBENFABRIKEN, VORMALS FR. BAYER & CO., of Elberfeld,) subjects of the Emperor of Germany, residing at Elberfeld, Germany, have invented a new and useful Improvement in the Manufacture of Azo Dye-Stuffs, (for which the aforesaid FARBENFABRIKEN has already obtained Letters Patent in the following countries: Germany, No. 58,271, dated November 10, 1889; England, No. 8,299, dated May 18, 1889; France, No. 198,521, dated October 21, 1889, and Italy, Vol. XXV, No. 29,265, and Vol. LVII, No. 442, dated February 28, 1891,) of which the following is a specification.

Our invention relates to the production of a new azo dye-stuff by combining one molecular proportion of diazotized amidosalicylic acid with one molecular proportion of 1:8—dihydroxynaphthalene.

In carrying out our process practically we proceed as follows: 1.53 kilos, by weight, of paramidosalicylic acid are dissolved in water, and this solution is mixed with a watery solution of 0.7 kilos, by weight, of sodium nitrite. After cooling by ice, hydrochloric acid is slowly added, until the liquid shows a lasting acid reaction. The diazo compound of amidosalicylic acid is formed in this way and separates as a fine crystal powder. When after some time the diazotizing is finished, the diazo compound is filtered off, washed and added with continuous stirring to a mixture prepared by mixing 1.6 kilos, by weight, of 1:8— dihydroxynaphthalene and three kilos, by weight, of sodium acetate with about ten kilos, by weight, of water and by acidulating with acetic acid. After some hours' standing the combination is completed. The thus formed azo dye-stuff separates and is isolated by filtering off and pressing. It may directly be employed (as paste), without previously drying, for printing purposes.

Our new coloring-matter obtained in the manner hereinbefore described possesses the following composition:

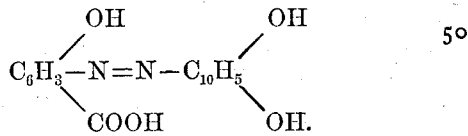

It forms after drying and pulverizing a greenish-black powder with metallic luster. In water it is difficultly soluble at ordinary temperature, more easily by hot water with bluish-red color. It is somewhat soluble in alcohol with violet-color. By ammonia, sodium carbonate and soda-lye it is dissolved with dark bluish-red color. In diluted hydrochloric and sulfuric acid it is almost insoluble, even on heating. On adding to its solutions in water ammonia, sodium carbonate or soda-lye, the original color becomes somewhat more reddish. When its watery solutions are mixed with diluted hydrochloric or sulfuric acid, the color turns at first into dull brownish-red, and subsequently brownish-red flakes are separated, while the supernatant liquid becomes colorless. By concentrated sulfuric acid it is dissolved with greenish-blue color, which on the addition of water turns at first into greenish-black, then into brown and, if a great quantity of water be added, the color becomes yellowish-brown. It produces on wool mordanted with chromium salts in acid baths deep black shades and yields the same shades, when a paste containing our new dye-stuff mixed with chromium salts and a suitable thickening is printed on cotton goods. The shades are fast against the action of soaping and alkalies.

Having thus described our invention and in what manner it can be performed, that which we claim as new, and desire to secure by Letters Patent, is—

1. The process for producing a new azo dye-stuff by combining one molecular proportion of the diazo-compound of amidosalicylic acid with one molecular proportion of 1:8—dihydroxynaphthalene.

2. As a new product the azo coloring-matter having the formula:

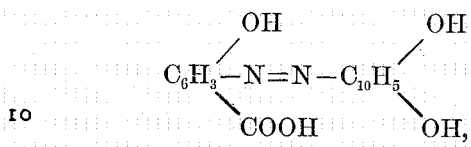

forming a greenish-black powder with metallic luster, difficultly soluble in water at ordinary temperature, more easily on heating, with bluish-red color, changing to a redder shade on addition of ammonia, sodium carbonate and caustic soda, and on addition of dilute hydrochloric and dilute sulfuric acid the aqueous solution changes at first to a dull brownish-red, and finally separates brownish-red flakes; slightly soluble in alcohol with violet color; almost insoluble in dilute hydrochloric and sulfuric acids; soluble in ammonia, sodium carbonate and caustic soda with dark bluish-red color; soluble in concentrated sulfuric acid with greenish-blue color, which on addition of water changes through greenish-black, brown to yellowish-brown; dyeing wool mordanted with chromium salts deep black, and producing when printed with chrome mordants on cotton the same shade; and having the qualities substantially as specified.

In testimony whereof we have signed our names in the presence of two subscribing witnesses.

RICHARD LAUCH.
CARL KREKELER.

Witnesses:
WM. ESSENWEIN,
RUDOLPH FRICKE.